United States Patent
Capeder et al.

(10) Patent No.: US 10,767,925 B2
(45) Date of Patent: Sep. 8, 2020

(54) METHOD FOR DEHYDRATION AND CRITICAL POINT DRYING

(71) Applicant: safematic GmbH, Zizers (CH)

(72) Inventors: Patrick Capeder, Maienfeld (CH); Walter Colleoni, Sulz (AT); Christof Graf, Sevelen (CH)

(73) Assignee: SAFEMATIC GMBH, Zizers (CH)

( * ) Notice: Subject to any disclaimer, the term of this patent is extended or adjusted under 35 U.S.C. 154(b) by 19 days.

(21) Appl. No.: 16/228,879

(22) Filed: Dec. 21, 2018

(65) Prior Publication Data

US 2019/0195556 A1 Jun. 27, 2019

(30) Foreign Application Priority Data

Dec. 22, 2017 (EP) ..................... 17210381

(51) Int. Cl.
*F26B 3/00* (2006.01)
*F26B 9/06* (2006.01)
(Continued)

(52) U.S. Cl.
CPC ............. *F26B 3/00* (2013.01); *F26B 5/005* (2013.01); *F26B 9/06* (2013.01); *F26B 25/22* (2013.01);
(Continued)

(58) Field of Classification Search
CPC .... F26B 3/00; F26B 5/005; F26B 9/06; F26B 25/22; G01N 1/28; G01N 1/40; G01N 2001/4027
(Continued)

(56) References Cited

U.S. PATENT DOCUMENTS 4,055,904 A 11/1977 Horne
4,510,169 A * 4/1985 Linner ..................... G01N 1/42
118/50

(Continued)

FOREIGN PATENT DOCUMENTS

EP 3502649 A1 * 6/2019 .............. F26B 5/005

OTHER PUBLICATIONS

Search Report for priority application EP 17210381.4 dated May 29, 2018.

(Continued)

*Primary Examiner* — Stephen M Gravini
(74) *Attorney, Agent, or Firm* — Renner, Otto, Boisselle & Sklar, LLP

(57) ABSTRACT

A method for dehydration and critical point drying of a sample in a single chamber is introduced, comprising the steps of (a) dehydrating the sample by replacing water by an intermediate fluid, (b) replacing the intermediate fluid by a transitional fluid, (c) pressurising the transitional fluid to or beyond its critical pressure and/or heating the transitional fluid (4 to or beyond its critical temperature, and (d) in response to gradually releasing the pressure, letting the transitional fluid gasify and escape from the sample. In step (a) and/or step (b), a ratio of the fluid to-be-replaced to the replacing fluid is measured and used to control a supply of the replacing fluid.

The method reduces consumption of intermediate fluid and/or transitional fluid, making the process more efficient in terms of duration and user interaction while ensuring a high degree of dryness and the integrity of the sample.

17 Claims, 2 Drawing Sheets

(51) Int. Cl.
  *G01N 1/40* (2006.01)
  *G01N 1/28* (2006.01)
  *F26B 5/00* (2006.01)
  *F26B 25/22* (2006.01)

(52) U.S. Cl.
  CPC ............... *G01N 1/28* (2013.01); *G01N 1/40* (2013.01); *G01N 2001/4027* (2013.01)

(58) Field of Classification Search
  USPC .......................................................... 34/357
  See application file for complete search history.

(56) References Cited

U.S. PATENT DOCUMENTS

| | | | | |
|---|---|---|---|---|
| 4,745,771 A * | 5/1988 | Linner | ..................... | G01N 1/42 |
| | | | | 118/50.1 |
| 4,894,357 A * | 1/1990 | Hupe | ................... | C01G 23/047 |
| | | | | 502/233 |
| 5,044,165 A * | 9/1991 | Linner | ..................... | B01D 8/00 |
| | | | | 118/50.1 |
| 5,822,882 A * | 10/1998 | Anger | ....................... | F26B 5/06 |
| | | | | 34/296 |
| 6,493,964 B1 | 12/2002 | Tousimis | | |
| 6,857,200 B1 * | 2/2005 | Tousimis | ................. | G01N 1/40 |
| | | | | 34/201 |
| 6,935,049 B2 * | 8/2005 | Alstat | ....................... | C02F 1/22 |
| | | | | 34/288 |
| 8,563,234 B2 | 10/2013 | Tousimis | | |
| 8,966,782 B2 * | 3/2015 | Kuu | ......................... | F26B 5/06 |
| | | | | 34/287 |
| 9,027,213 B2 | 5/2015 | Tousimis | | |
| 9,426,980 B2 | 8/2016 | Tousimis | | |
| 9,739,532 B2 * | 8/2017 | Baugh | ....................... | F26B 5/06 |
| 9,945,611 B2 * | 4/2018 | DeMarco | ................ | F26B 5/065 |
| 10,451,346 B1 * | 10/2019 | Nguyen | ................... | F26B 5/065 |
| 10,508,379 B2 * | 12/2019 | Lowe | ....................... | D06F 58/04 |
| 10,551,122 B2 * | 2/2020 | Weisselberg | .............. | F26B 5/00 |
| 2013/0174440 A1 | 7/2013 | Tousimis | | |
| 2014/0020220 A1 | 1/2014 | Tousimis | | |
| 2015/0216162 A1 | 8/2015 | Tousimis | | |
| 2019/0195556 A1 * | 6/2019 | Capeder | ................... | F26B 3/00 |

OTHER PUBLICATIONS

Leica Microsystems: CPD300: https://www.leica-microsystems.com/products/sample-preparation-for-electron-microscopy /p/leica-em-cpd300/.

Tousimis: Samdri: https://tousimis.com/critical_point_dryers/MEMS_drying_system.html.

2SPU: Critical Point Dryer: https://www.2spi.com/category/critical-point-dryer/.

Electron Microscopy Sciences: EMS 850: https://www.emsdiasum.com/microscopy/products/equipment/critical_point_drier.aspx.

NTT Advanced Technology Corp.: PCO-4SC: http://www.ntt-at.com/product/cs_dryer/.

* cited by examiner

METHOD FOR DEHYDRATION AND CRITICAL POINT DRYING

CROSS REFERENCES TO RELATED APPLICATIONS

This application claims the priority of European patent application No. 17 210 381.4, filed Dec. 22, 2017, the disclosure of which is incorporated herein by reference in its entirety.

TECHNICAL FIELD

The present invention relates to a method for dehydration and critical point drying of a sample, to an apparatus to perform dehydration and critical point drying, and to a computer readable element which controls the process of dehydration and critical point drying.

BACKGROUND ART

Critical point drying is a process to remove liquid, e.g. water, in a controlled way from a sample. It is commonly used to remove water, e.g. from biological samples in the preparation for scanning electron microscopy and in the production of microelectromechanical systems (MEMS).

Critical point drying exploits the property that fluids exhibit a supercritical state if temperature and pressure are above the critical point, where no phase boundary between liquid and gas exists. If the transition from liquid to gas is performed via the supercritical regime, damaging or a collapse of the delicate sample is avoided due to the absence of detrimental surface tension of the liquid.

For water the critical point is at a temperature of 374° C. and a pressure of 22.06 MPa. The high critical temperature makes it inconvenient to directly perform critical point drying on an aqueous sample since it would cause heat damage. Hence a transitional fluid is used, usually liquid carbon dioxide (CO2) which has a critical temperature of 31° C. and a critical pressure of 7.39 MPa. However, CO2 is not miscible with water, therefore an intermediate fluid is used in an intermediate step to dehydrate the sample before performing critical point drying with CO2. Commonly used intermediate fluids are acetone, ethanol, isopropanol, amyl acetate, or a solution of one of those in water.

Typically a critical point drying process contains the following steps:
  Transporting the dehydrated samples in the intermediate fluid into a chamber under ambient pressure. The chamber may partly be filled with intermediate fluid to avoid the surface of the sample becoming touch dry.
  Replacing the intermediate fluid in the chamber with the transitional fluid.
  Transferring the transitional fluid from liquid to supercritical state by heating and pressurising the chamber. Meanwhile a part of the transitional fluid is drained from the chamber to avoid excessive overpressure.
  Transferring the supercritical transitional fluid to the gaseous state by slowly depressurising the chamber and letting the gas escape while heating to avoid recondensation of the transitional fluid. Finally the chamber is at ambient pressure, and the sample can be removed.

With common systems the step of dehydrating the sample by means of the intermediate fluid is performed in a separate vessel, mostly manually, before transporting the sample into the chamber. The amount of intermediate fluid and time is chosen according to empirical values, which leads to a high consumption of intermediate fluid and a long process duration in order to make sure that the sample is sufficiently dehydrated.

After dehydration the sample is manually transferred to the chamber. Since the sample should not be in contact with surrounding air, careful handling has to be applied with dedicated transport vessels.

In order to ensure sufficient replacement of the intermediate fluid by the transitional fluid, large amounts of transitional fluid are flowed through the chamber, and additional rest periods may be interposed to improve diffusion of the intermediate fluid out of the sample. The parameters of this process are again chosen according to empirical values and lead to a high consumption of transitional fluid and a long process duration.

DISCLOSURE OF THE INVENTION

The problem to be solved by the present invention is to reduce consumption of intermediate and/or transitional fluids in the process of dehydration and critical point drying of a sample.

The problem is solved by a method for dehydration and critical point drying of a sample in a single chamber, comprising the steps of (a) dehydrating the sample by replacing water by an intermediate fluid, (b) replacing the intermediate fluid by a transitional fluid, (c) pressurising the transitional fluid to or beyond its critical pressure and/or heating the transitional fluid to or beyond its critical temperature, and (d) in response to gradually releasing the pressure, letting the transitional fluid gasify and escape from the sample. In step a) and/or step b), a ratio of the fluid to-be-replaced to the replacing fluid is measured and used to control a supply of the replacing fluid. In step (a) the fluid to-be-replaced is water, and the replacing fluid is the intermediate fluid. In step (b) the fluid to-be-replaced is the intermediate fluid, and the replacing fluid is the transitional fluid.

The use of a single chamber for the entire process reduces user interaction and avoids difficult and error-prone manual handling of the sample and the use of special transport vessels between the dehydration in step (a) and the subsequent critical point drying in steps (b), (c) and (d). Through measuring the ratio of the fluid to-be-replaced to the replacing fluid in step (a) and/or step (b), the process also becomes more efficient in terms of duration while ensuring a high degree of dryness of the sample, and at the same time reducing the consumption of intermediate and/or transitional fluids.

Critical point drying exploits the property of fluids to exhibit a supercritical state if temperature and pressure are above the critical point, where no phase boundary exists between liquid and gas. If the transition from liquid to gas is performed via the supercritical regime, damaging or a collapse of the delicate sample is avoided due to the absence of the detrimental surface tension of the liquid.

The process is used to remove water from samples, e.g. from biological samples in the preparation for scanning electron microscopy and in the production of microelectromechanical systems (MEMS), and ensures integrity of the sample.

An intermediate fluid is used to replace water from the sample in step (a), called dehydration, since critical point drying cannot be performed on the aqueous sample directly. The intermediate fluid is able to replace water, preferably from the inside and/or the surface of the sample, e.g. by dissolving it. The dehydration may in a preferred embodiment be conducted by filling the chamber with intermediate fluid, letting the water and the intermediate fluid mix and exhausting the fluid mixture from the chamber by flushing the chamber with more intermediate fluid. In a preferred embodiment of the invention, the intermediate fluid is a liquid, in particular one of ethanol, acetone, isopropanol, amyl acetate, or a solution of one of those in water, wherein a ratio of the water relative to the one of ethanol, acetone, isopropanol, amyl acetate may in particular decrease during supply of the solution into the chamber. This may prevent the sample from damage.

The intermediate fluid in the chamber is replaced by the transitional fluid in step (b), preferably in a way identical or similar to step (a). Critical point drying is performed, i.e. the transitional fluid in the sealed chamber is transferred from liquid to supercritical state by pressurising and/or heating above its critical point (step c) and then transferred from supercritical to gaseous state by gradually depressurising the chamber (step d). In step (d) the pressure may not be released too quickly in order to prevent recondensation of the gaseous transitional fluid, and the gas exhausts from inside the inside and/or the surface of the sample and preferably from the chamber. The transitional fluid preferably has its critical point in an easily accessible parameter range in terms of pressure and temperature where the sample is not damaged. In a preferred embodiment of the invention, the transitional fluid is a liquid, in particular liquid carbon dioxide.

Preferably in step (a) the content of water in the intermediate fluid is determined continuously or discretely, e.g. by relative or absolute measurements of water concentration and/or concentration of intermediate fluid. In a preferred embodiment the content of water in the intermediate fluid is diagnosed through a density sensor since the density of the intermediate fluid is known. Such density sensor is typically compactly built and has a high resolution. A sensor for measuring the ratio in step a) may be arranged in or at the chamber, or, in a different embodiment, may be arranged in or at outlet of the chamber, thereby measuring the ratio in the fluid leaving the chamber. Preferably, during step a) the fluid in the chamber and the fluid in the outlet both are in the liquid phase. In one embodiment the measurement is used to determine when the water content has fallen below a predefined limit. This can be achieved by monitoring the measured ratio of the fluid to-be-replaced to the replacing fluid, stopping the supply of intermediate fluid and/or continuing with step (b) only if the ratio falls below the predefined limit. In a different embodiment the supply of intermediate fluid may be reduced and/or the chamber may be flushed with fresh intermediate fluid in response to the ratio falling below the predefined limit.

Preferably in step (b) in addition or alternative to step (a), the content of intermediate fluid in the transitional fluid may be measured, e.g. by continuous or discrete, relative or absolute measurements of the concentration of intermediate fluid and/or the concentration of transitional fluid, and used to control the supply of transitional fluid correspondingly as described for the intermediate fluid in step (a). In a preferred embodiment the intermediate fluid is ethanol, and the content of ethanol in the transitional fluid is measured through an alcohol probe. Measurements with the alcohol probe in a preferred embodiment are conducted in the gaseous phase preferably with a high sensitivity and preferably towards the end of the drying process. In this embodiment, the sensor preferably is arranged in or at the outlet of the chamber, thereby measuring the ratio in the fluid leaving the chamber. In view of a significant pressure drop between the interior of the chamber and the environment including the outlet of the chamber, during step b) the fluid in the chamber preferably is in its liquid phase, while fluid escaping from the chamber into the outlet converts into its gaseous phase, such that in this embodiment a gas sensor can detect the ratio in the outlet.

When replacing one fluid with another in steps (a) and/or (b), the fluid present inside the chamber can be left at rest with diffusion being the only mechanism acting to mix the fluids. In a preferred embodiment of the invention, the efficiency of fluid replacement is enhanced by circulating the fluid in the chamber. This facilitates diffusion and mixing by avoiding locally high concentrations of the fluid to-be-replaced. In a different embodiment, the chamber can be flushed with fresh intermediate and/or transitional fluid in steps (a) and/or (b), respectively, and in particular two of, or all of resting, circulating and/or flushing can be performed iteratively. The flow rate of the inflow of replacing fluid and/or the flow rate of circulating the fluid in the chamber may be controlled.

The chamber is preferably sealed for steps (b) and (c). In one embodiment of the invention, the temperature of the replacing fluid and a temperature of fluid present inside the chamber are sensed. The measured values are preferably used to control cooling the fluid present inside the chamber with a cooling element below a temperature of the replacing fluid, causing the replacing fluid to stay liquid when entering the chamber. For that purpose the temperature of the fluid present in the chamber is in particular set to a level at least 5° C., in particular 10-12° C., below the temperature of the replacing fluid.

A further challenge in the transition from step (a) to step (b) may be to avoid a pressure shock in the chamber. A pressure shock can occur when supplying pressurised transitional fluid into the chamber, and the pressure waves may damage the sample. A preferred embodiment avoids two possible reasons for the pressure shock: the existence of a compressible air bubble and different pressure levels in the chamber and the supply line, e.g. when liquid carbon dioxide is supplied at approximately 55 bar into an unpressurised chamber. For that purpose it is preferred that firstly a fill level of the fluid present inside the chamber is sensed, and sufficient intermediate fluid is supplied to replace air in the chamber, to immerse and cover the sample in the intermediate fluid and to raise the fill level of the fluid present inside the chamber to be equal or greater than a predefined value. Secondly it is preferred that the pressure of the transitional fluid in the supply line and the pressure in the chamber are measured, and the supply of transitional fluid is only opened if the two pressure levels match within a predefined margin. To raise the pressure inside, the chamber may be heated, e.g. by 2-7° C.

A preferred aspect of the present invention refers to a computer readable element comprising computer readable code means that are operated on a control unit to perform the embodiments of the methods described above.

In order to conduct the method of dehydration and critical point drying of a sample, an apparatus is provided comprising a chamber to host the sample, a supply for an intermediate fluid into the chamber to dehydrate the sample by replacing water, a supply for a transitional fluid into the chamber to replace the intermediate fluid, a sensor to measure a ratio of the fluid to-be-replaced to the replacing fluid, a heating element to perform critical point drying of the sample, and a control unit.

In different embodiments the chamber may for instance be a vessel, an autoclave or similar made from materials such as metal, glass, plexiglass, etc., which supports pressure levels greater than the critical pressure of the transitional fluid. The supply for the intermediate fluid and the supply for the transitional fluid are preferably established as tubes, ducts or pressure lines from the reservoirs of intermediate and transitional fluid, e.g. a plastic container and a pressure cylinder, connected to the chamber via an inlet, preferably equipped with one or more valves. The supply for the intermediate fluid and the supply for the transitional fluid can in particular be combined within one tube, duct or pressure line.

The sensor to measure a ratio of the fluid to-be-replaced to the replacing fluid is preferably designed to measure a value indicative of the ratio of water to intermediate fluid and/or a value indicative of the ratio of intermediate fluid to transitional fluid. In particular the sensor can be composed of different sensor elements, which measure the concentration of water and/or intermediate fluid and/or transitional fluid. In an embodiment the sensor elements may be resistive or capacitive sensors, or they may determine the measurement value by sensing optical properties or the density of the fluid mixture.

The control unit is configured to control the supply of at least one of the intermediate and transitional fluids into the chamber depending on the measured ratio of water to intermediate fluid and/or intermediate fluid to transitional fluid, respectively. It also controls pressurising the transitional fluid to or beyond its critical pressure and/or heating the transitional fluid with the heating element to or beyond its critical temperature, and in response to gradually releasing the pressure, letting the transitional fluid gasify and escape from the sample.

In an embodiment the control unit may be a hard-wired controller, whereas in another embodiment it may be software implemented on a processor. Preferably the control unit may be integrated into the apparatus together with the chamber, but it may also be a remote control unit in a distributed system.

In a preferred embodiment the apparatus also comprises one or more of the following elements to conduct different aspects of the method described above: a temperature sensor as well as a pressure sensor inside the chamber, a temperature sensor as well as a pressure sensor for the replacing fluid, e.g. in the supply line, and a cooling element to cool fluid present inside the chamber. Heating and cooling elements may preferably be combined, e.g. in the form of a Peltier element.

A further embodiment comprises a sensor to measure a fill level, e.g. by ultrasound, in the chamber for controlling the fill level of the intermediate fluid in such a way that a pressure shock is avoided or reduced when supplying pressurised transitional fluid. Yet another embodiment comprises a pump to circulate fluid within the chamber to improve mixing.

BRIEF DESCRIPTION OF THE DRAWINGS

The embodiments defined above and further aspects, features and advantages of the present invention can also be derived from the examples of embodiments to be described hereinafter and are explained with reference to the drawings. In the drawings it is illustrated in.

MODES FOR CARRYING OUT THE INVENTION

Figure 1:
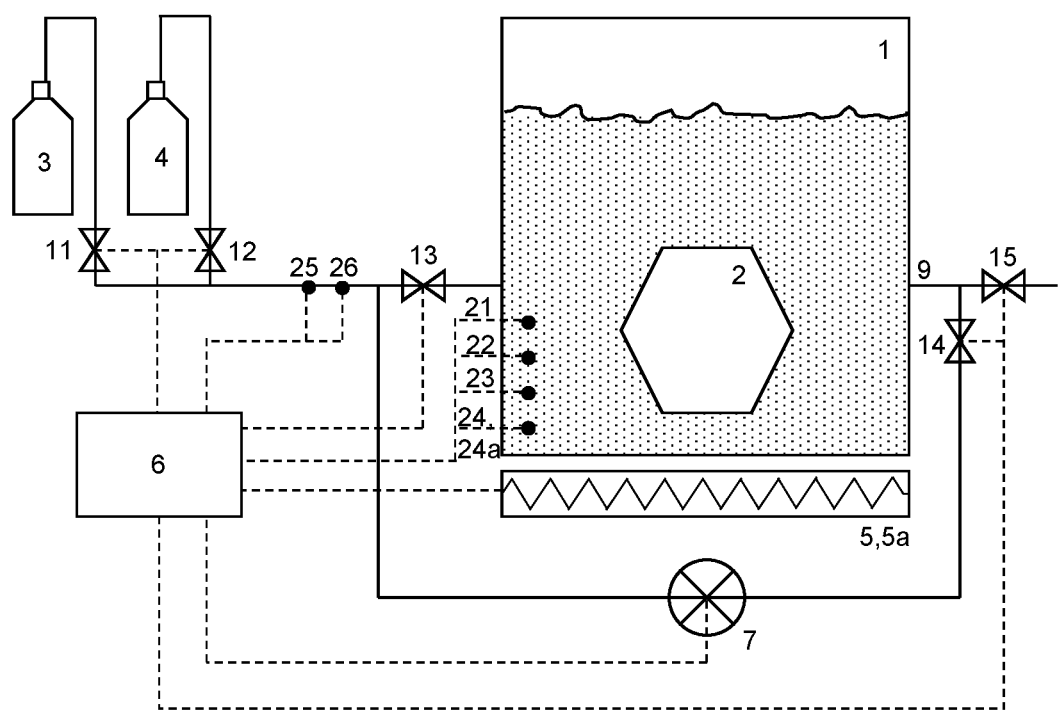
FIG. 1 a block diagram of an apparatus according to an embodiment of the present invention.

FIG. 1 shows a block diagram of an apparatus according to an embodiment of the present invention. The function and purpose of the different elements is detailed later in the description of FIG. 2. The apparatus of FIG. 1 comprises a chamber 1 to house a sample 2, a supply of intermediate fluid 3, a supply of transitional fluid 4, a heating element 5 to heat fluid present inside the chamber and a control unit 6. Preferably the supplied intermediate fluid 3 is one of ethanol, acetone, isopropanol, amyl acetate, or a solution of one of those in water, and the supplied transitional fluid 4 is liquid carbon dioxide. The heating element 5 is preferably combined with a cooling element 5a.

The control unit 6 controls the process of dehydration and critical point drying. For that purpose it receives measurement values from sensors 21-26. Preferably the apparatus comprises a pressure sensor 21 and a temperature sensor 22 to measure the pressure and the temperature inside the chamber 1, respectively, as well as a sensor 23 to measure a liquid fill level in the chamber, and sensors 24 and 24a to measure a ratio of water to intermediate fluid, and a ratio of intermediate fluid to transitional fluid in the chamber, respectively. Preferably the apparatus also comprises a pressure sensor 25 and a temperature sensor 26 to measure pressure and temperature, respectively, in a supply line between the supply of intermediate fluid 3 and transitional fluid 4 and the chamber 1.

The embodiment of the invention in FIG. 1 also comprises valves 11-15 which are controlled by the control unit 6. Valves 11-13 regulate the supply of fluids into the chamber 1, valves 14 and 15 regulate the outlet of the chamber 1. Valves 14 and 15, or an additional or valve at the outlet 9 are used to control an outflow of intermediate fluid 3 or transitional fluid 4, and to control a depressurising of the chamber 1. Preferably the apparatus also comprises a pump 7 which is also controlled by the control unit 6.

Figure 2:
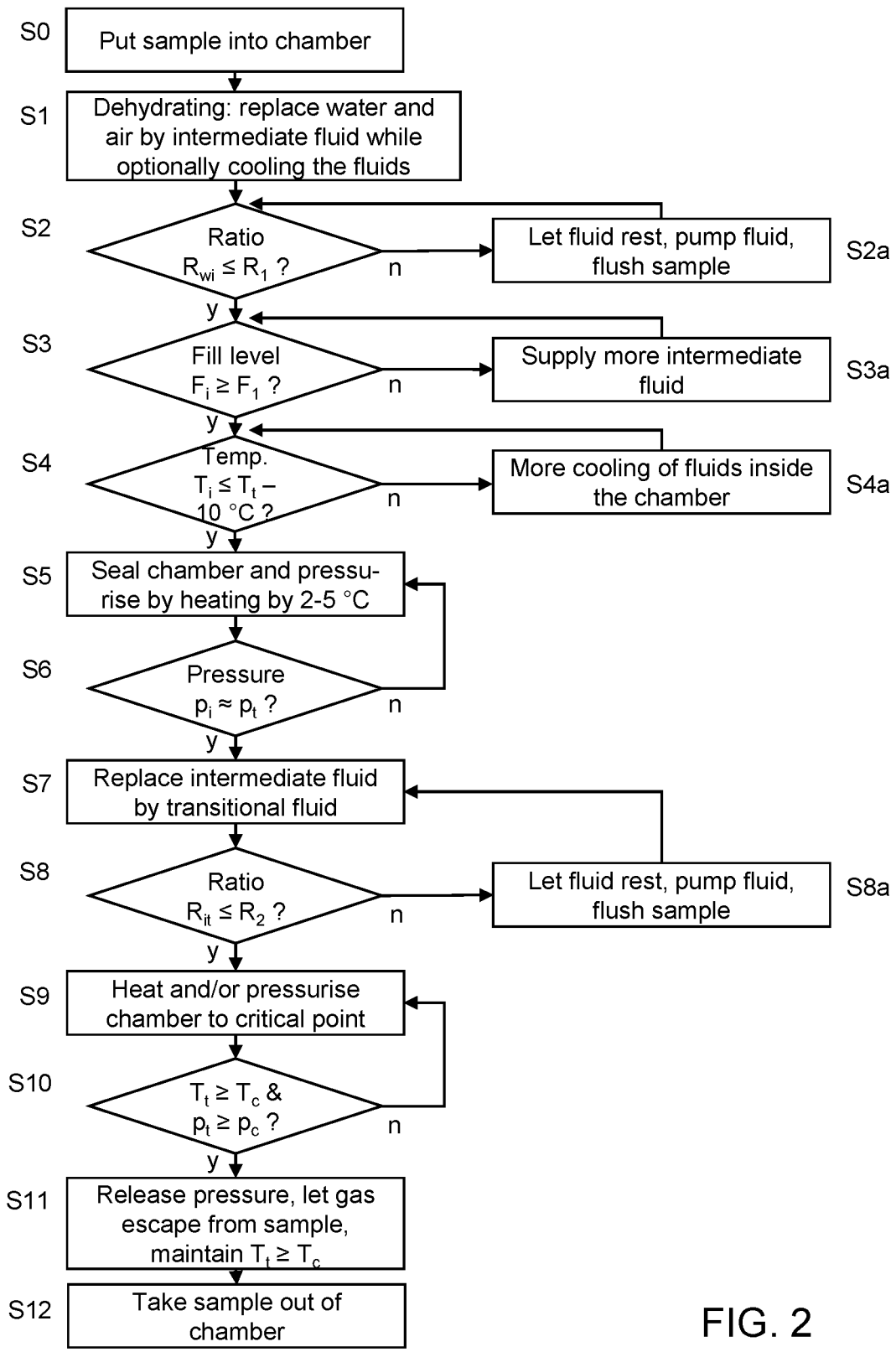
FIG. 2 a flow chart of a method according to an embodiment of the present invention.

FIG. 2 shows a flow chart of a method for dehydrating and critical point drying according to an embodiment of the present invention, preferably as conducted with an apparatus, e.g. as shown in FIG. 1. In a preparatory step S0, a water-containing sample 2 is put into the chamber 1. The sample 2 may for instance be a biological sample or a microelectromechanical system (MEMS) chip which has to be dried. In step S1 the chamber 1 is filled with an intermediate fluid 3 which dissolves and replaces the water from the sample 2, i.e. dehydrates the sample 2. Simultaneously the fluid inside the chamber may be cooled in preparation for connecting the supply of transitional fluid in step S7. To ensure sufficient dehydration of the sample 2, a ratio $R_{wi}$ of water to intermediate fluid 3 is measured with sensor 24 in the chamber in step S2. The value of $R_{wi}$ may for instance be determined by measurements of absolute or relative water content inside the chamber or by sensing one of these values at an outlet 9 of the chamber. The water content can e.g. be diagnosed through a density sensor, taking into account the known density of the intermediate fluid.

If $R_{wi}$ is greater than a predefined value $R_1$ (n), dehydration is continued in step S2a with two or more of the following possibilities: The fluid present inside the chamber 1 may be left at rest for some time to allow the water to diffuse out of the sample 2 and get dissolved in the intermediate fluid 3; the fluid may be circulated inside the chamber 1 by means of the pump 7 to avoid locally high concentrations of water that inhibit diffusion; or the chamber 1 may be flushed with fresh intermediate fluid 3. By monitoring $R_{wi}$, it is ensured that only the necessary amount of intermediate fluid 3 is used. This reduces considerably the consumption of intermediate fluid 3 and also the process time compared to other methods.

If the measured value of $R_{wi}$ is equal to or below a predefined value $R_1$ in step S2 (y), the process is continued with step S3 which checks the fluid fill level $F_1$ in the chamber 1 by means of sensor 23 to avoid air bubbles that can lead to pressure shocks when pressurised transitional fluid 4 is supplied, which would damage the sample 2. If $F_i$ is below a predefined value $F_1$ (n), more intermediate fluid 3 is supplied in step S3a. Otherwise (y) in step S4, the temperature values $T_i$ inside the chamber 1 and $T_t$ of the supply of transitional fluid 4 are measured with sensors 22 and 26, respectively, to ensure that the transitional fluid 4 flowing into the chamber 1 in step S7 is always liquid. If $T_i$ is smaller than $T_t$ by at least 10° C., in particular by 10-12° C., the process is continued with step S5, otherwise more cooling is applied to the fluid inside the chamber 1.

In step S5 the chamber 1 is sealed and pressurised to pressure $p_i$ by heating it with heating element 5, e.g. by at least 2° C. and up to 5° C. or 7° C., in order to reach the pressure level $p_t$ of the supply of transitional fluid 4. In step S6 the measured values $p_i$ and $p_t$ of sensors 21 and 25, respectively, are compared, and the process is only continued with the next step if the two values are approximately equal (y); otherwise more heating is applied (n). As a consequence of the cooling in steps S2-S4 and the heating in steps S5-S6, $T_i$ is smaller than $T_t$ by 5° C. or more, which ensures that the inflowing transitional fluid 4 in step S7 stays liquid.

In step S7 the supply of transitional fluid 4 is opened to replace the intermediate fluid 3. The progress of the replacement is monitored by measuring the ratio $R_{it}$ of intermediate fluid 3 to transitional fluid 4 in the chamber 1 with sensor 24a in step S8. Possible realisations of the measurement are analogous to step S2. As long as $R_{it}$ is greater than a predefined value $R_2$ (n), the fluid may again be left at rest for a while, or circulated inside the chamber 1, or the chamber 1 may be flushed with more transitional fluid 4 in step S8a. If $R_{it}$ is equal to or below $R_2$ (y), the process of critical point drying is started. By monitoring $R_{it}$, it is ensured that only the necessary amount of transitional fluid 4 is used. This reduces considerably the consumption of transitional fluid 4 and also the process time compared to other methods.

In step S9 the chamber 1 is pressurised to or above the critical pressure $p_c$ corresponding to the critical point of the transitional fluid 4. Also, if necessary, the chamber 1 is heated to or above the critical temperature $T_c$. These conditions are checked with sensors 21 and 22 measuring pressure $p_t$ and temperature $T_t$, respectively. If pressure and temperature are both sufficiently high as measured in step S10 (y), the pressure is gradually released, letting the gasified transitional fluid 4 escape from the inside and/or the surface of the sample 2 and preferably the chamber 1 in step S11. During this step the temperature $T_t$ is maintained at or above $T_c$ by heating to avoid recondensation of the transitional fluid 4. When the pressure in the chamber 1 has gone down to ambient pressure, the dry sample 2 is taken out of the chamber 1 in the last step S12.

The invention claimed is:

1. A method for dehydration and critical point drying of a sample in a single chamber, the method comprising the steps of:
   a) dehydrating the sample by replacing water with an intermediate fluid,
   b) replacing the intermediate fluid with a transitional fluid having a critical temperature and a critical pressure,
   c) one or more of pressurising the transitional fluid to or beyond said critical pressure and heating the transitional fluid to or beyond said critical temperature, and
   d) in response to gradually releasing the pressure, letting the transitional fluid gasify and escape from the sample, and
   wherein one or more of:
   in step a) a first ratio of the water to the intermediate fluid is measured and used to control a supply of the intermediate fluid; and
   in step b), a second ratio of the intermediate fluid to the transitional fluid is measured and used to control a supply of the transitional fluid.

2. The method according to claim 1, comprising:
   a combination of two or more of leaving fluid present inside the chamber at rest, circulating the fluid present inside the chamber, and flushing the chamber with at least one of fresh intermediate fluid in step a) and fresh transitional fluid in step b).

3. The method according to claim 2, wherein the combination is repeated.

4. The method according to claim 1, comprising:
   one or more of
      continuing with step b) after step a) in response to the first ratio falling below a predefined limit, and
      continuing with step c) after step b) in response to the second ratio falling below a second pre-defined limit.

5. The method according to claim 1, comprising:
   one or more of
      stopping the supply of the intermediate fluid in step a) in response to the first ratio falling below a third predefined limit, and
      stopping the supply of the transitional fluid in step b) in response to the second ratio falling below a fourth predefined limit.

6. The method according to claim 1, comprising:
   sensing a temperature of the intermediate fluid outside the chamber in step a) and, respectively, of the transitional fluid outside the chamber in step b), and a temperature of fluid present inside the chamber.

7. The method according to claim 6, comprising:
   cooling the fluid present inside the chamber below the temperature of the intermediate fluid in step a), causing the intermediate fluid to stay liquid when entering the chamber, and
   cooling the fluid present inside the chamber below the temperature of the transitional fluid in step b), causing the transitional fluid to stay liquid when entering the chamber.

8. The method according to claim 7, wherein the temperature of the fluid present inside the chamber is controlled to a temperature level at least 5° C. below the temperature of the intermediate fluid in step a) and at least 5° C. below the temperature of the transitional fluid in step b).

9. The method according to claim 1, comprising:
   sensing a fill level of fluid present inside the chamber.

10. The method according to claim 1, comprising:
    heating fluid present inside the chamber to raise a pressure in the chamber and measuring the pressure in the chamber.

11. The method according to claim 1, comprising:
    sensing a fill level of fluid present inside the chamber, heating the fluid present inside the chamber to raise a pressure in the chamber and measuring the pressure in the chamber, and switching to step b), only if the fill level of the fluid present inside the chamber is equal to or greater than a predefined value in order to immerse the sample in the intermediate fluid, and if a pressure level of the transitional fluid outside the chamber and the pressure in the chamber match within a predefined margin, in order to avoid or reduce a pressure shock.

12. The method according to claim 1, wherein the intermediate fluid is one of ethanol, acetone, isopropanol, amyl acetate, or a solution of one of ethanol, acetone, isopropanol and amyl acetate in water, and the transitional fluid is liquid carbon dioxide.

13. A computer readable product, comprising computer readable code for causing a performance of a method according to claim 1 when operated on a control unit.

14. An apparatus to perform dehydration and critical point drying of a sample, comprising:
   a chamber configured to host the sample,
   a supply for an intermediate fluid into the chamber to dehydrate the sample by replacing water,
   a supply for a transitional fluid into the chamber to replace the intermediate fluid, the transitional fluid having a critical temperature and a critical pressure,
   a sensor configured to measure one or more of
      a first ratio of the water to the intermediate fluid, and
      a second ratio of the intermediate fluid to the transitional fluid, a heating element configured to perform critical point drying of the sample, and
   a control unit configured to
      control one or more of the supply of intermediate fluid into the chamber depending on the first ratio and the supply of transitional fluid into the chamber depending on the second ratio,
      control one or more of pressurising the transitional fluid to or beyond said critical pressure and heating the transitional fluid with the heating element to or beyond said critical temperature, and
      control, in response to gradually releasing the pressure, letting the transitional fluid gasify and escape from the sample.

15. The apparatus according to claim 14, comprising:
a pump configured to circulate fluid present inside the chamber.

16. The apparatus according to claim 14, comprising one or more of:
a temperature sensor as well as a pressure sensor arranged inside the chamber,
a temperature sensor as well as a pressure sensor configured to sense one or more of the intermediate fluid and the transitional fluid outside the chamber, and
a cooling element configured to cool fluid present inside the chamber.

17. The apparatus according to claim 14, comprising:
a sensor configured to measure a fill level in the chamber for controlling the fill level of the intermediate fluid in such a way that a pressure shock is avoided or reduced when supplying pressurised transitional fluid.

* * * * *